(12) United States Patent
Umimoto et al.

(10) Patent No.: US 9,115,011 B2
(45) Date of Patent: *Aug. 25, 2015

(54) APPARATUS AND METHOD FOR PRODUCING ELECTROLYZED WATER

(75) Inventors: Koichi Umimoto, Kobe (JP); Shunji Nagata, Nara (JP)

(73) Assignee: OSAKA ELECTRO-COMMUNICATION UNIVERSITY, Osaka (JP)

( * ) Notice: Subject to any disclaimer, the term of this patent is extended or adjusted under 35 U.S.C. 154(b) by 637 days.

This patent is subject to a terminal disclaimer.

(21) Appl. No.: 13/466,554

(22) Filed: May 8, 2012

(65) Prior Publication Data

US 2012/0234693 A1    Sep. 20, 2012

Related U.S. Application Data

(63) Continuation of application No. 12/895,568, filed on Sep. 30, 2010, now Pat. No. 8,173,006.

(30) Foreign Application Priority Data

Apr. 28, 2010   (JP) ................................. 2010-104147

(51) Int. Cl.
  *C02F 1/46*       (2006.01)
  *C02F 1/467*      (2006.01)

(52) U.S. Cl.
  CPC ..... *C02F 1/4674* (2013.01); *C02F 2201/46115* (2013.01); *Y10T 29/49002* (2015.01)

(58) Field of Classification Search
  USPC ........... 205/701, 746, 748; 204/253, 257, 263
  See application file for complete search history.

(56) References Cited

U.S. PATENT DOCUMENTS

| | | | |
|---|---|---|---|
| 7,186,323 B2 | 3/2007 | Hara | |
| 2005/0126928 A1* | 6/2005 | Hung et al. | 205/746 |
| 2007/0108064 A1* | 5/2007 | Buckley et al. | 205/620 |

FOREIGN PATENT DOCUMENTS

| | | |
|---|---|---|
| JP | 08-229565 A | 9/1996 |
| JP | 09-262584 A | 10/1997 |

(Continued)

OTHER PUBLICATIONS

Abadias, M., et al., "Efficacy of neutral electrolyzed water (NEW) for reducing microbial contamination on minimally-processed vegetables," International Journal of Food Microbiology, vol. 123, pp. 151-158 (2008).

(Continued)

*Primary Examiner* — Arun S Phasge
(74) *Attorney, Agent, or Firm* — Maschoff Brennan

(57) ABSTRACT

An electrolyzed water production apparatus and method safely and simply produce electrolyzed water having a sterilizing action, having a physiologically neutral pH value, and, in addition, simultaneously with strong acidic electrolyzed water and strong alkaline electrolyzed water depending upon the structure. The electrolyzed water production apparatus has an electrolyzer tank with an end that receives or stores raw water, and a power supply. The interior portion of the electrolyzer tank is partitioned by a plurality of diaphragms into a plurality of regions. An anode and a cathode (constituting an electrode pair) are positioned on either side of the diaphragm. In a certain region of the electrolyzer tank, an anode and a cathode are arranged so as to face each other without a diaphragm sandwiched between them. When raw water for electrolysis is electrolyzed, electrolyzed water having a desired pH of a neutral range is produced during electrolysis.

18 Claims, 9 Drawing Sheets

(56) References Cited

FOREIGN PATENT DOCUMENTS

| | | |
|---|---|---|
| JP | 11-169856 A | 6/1999 |
| JP | 2000-070947 A | 3/2000 |
| JP | 2000-254647 A | 9/2000 |
| JP | 2003-062574 A | 3/2003 |
| JP | 2004-188300 A | 7/2004 |
| WO | 2009/067213 A2 | 5/2009 |

OTHER PUBLICATIONS

Umimoto, K., et al., "Development of automatic controller for providing multi electrolyzed water", Medical Physics and Biomedical Engineering, vol. 25/7, pp. 306-309 (Sep. 7-12, 2009).

* cited by examiner

APPARATUS AND METHOD FOR PRODUCING ELECTROLYZED WATER

CROSS-REFERENCE TO RELATED APPLICATIONS

This patent application is a continuation under 35 U.S.C.§120 of U.S. patent application Ser. No. 12/895,568 filed Sep. 30, 2010, now U.S. Pat. No. 8,173,006, which claims priority to Japanese Patent Application No. 2010-104147 filed Apr. 28, 2010, which are incorporated herein by reference.

TECHNICAL FIELD

Embodiments of the present disclosure relate to an apparatus for producing electrolyzed water (or electrolytic ion water) and a method for producing electrolyzed water.

BACKGROUND

Generally, in an electrolyzer tank that stores an aqueous solution, for example, city water containing, for example, common salt (sodium chloride) serving as an electrolysis aid, an electrode pair composed of an anode and a cathode is provided and a diaphragm is interposed between these electrodes. The aqueous solution is then electrolyzed under predetermined conditions to thereby produce strong acidic electrolyzed water (SAEW) on the anode side and strong alkaline electrolyzed water on the cathode side. This is called diaphragm electrolysis. It is known that the strong acidic electrolyzed water produced on the anode side contains soluble chlorine (Cl) and kills microorganisms such as various viruses and bacteria owing to the chlorine-containing hypochlorous acid (HClO), exerting a strong cleansing/sterilizing action. To describe more specifically, the strong acidic electrolyzed water exerts a sterilizing action against almost all bacteria and viruses for example, methicillin-resistant *Staphylococcus aureus* (MRSA) causing nosocomial infection and hepatitis B virus (HBV) and hepatitis C virus (HCV), and thus, it has been widely recognized that such a hypochlorous acid solution serves as a low-concentration high-activity sterilizing water.

Furthermore, the strong acidic electrolyzed water having such an efficacy can be easily produced just by electrolyzing, for example, a salt solution. Thus, the production cost is low. Furthermore, since irritation on the skin mucous membrane is low, the strong acidic electrolyzed water is highly safe and known to be friendly also to environment. Moreover, in the medical field, the strong acidic electrolyzed water has been approved (approval as a medical device) under the pharmaceutical laws as a product that can be used for antiseptic washing of fingers and endoscopes. The strong alkaline electrolyzed water produced on the cathode side is also said to have high cleansing performance compared to, for example, city water.

Herein, for example, Japanese Patent Laid-Open No. 2000-70947 proposes an electrolyzed water production apparatus for electrolyzing an aqueous sodium hypochlorite solution, which is produced by non-diaphragm electrolysis of a salt solution or previously prepared, used as a raw water for electrolysis.

SUMMARY

However, the strong acidic electrolyzed water obtained as described above basically has a liquid property within the non-physiological pH (hydrogen-ion concentration exponent, hydrogen ion exponent) range, and therefore, direct application thereof to a living body is slightly unfavorable. Then, to make the pH of the strong acidic electrolyzed water closer to the physiological pH, use of an appropriate pH adjuster is conceivable. However, care should be taken when handling such a pH adjuster and complicated operations are unavoidable when using it. Furthermore, besides an electrolyzer tank, an instrument and a container for storing and feeding such a pH adjuster are required. The scale of the apparatus increases and maintenance thereof will be required or complicated. In addition, during electrolysis for producing strong acidic electrolyzed water (SAEW), chlorine gas ($Cl_2$) generates. For these reasons, there are actually too many obstacles to use such an apparatus in medical sites and ordinary households and thus the apparatus has not yet been widely used at present.

On the other hand, in the conventional electrolyzed water production apparatus described in the aforementioned Japanese Patent Laid-Open No. 2000-70947, the electrolyzed water having a low hydrogen ion concentration (high pH) produced on a cathode side is taken out and the pH of the remaining electrolyzed water is controlled to about 2 to 6. In this method, measurement is required for taking out the electrolyzed water on the cathode side and a container is required for controlling the amount. A pH controlling operation is difficult and complicated, and further the structure of the apparatus is complicated, with the result that handling thereof may become difficult. These problems may probably occur. Furthermore, to control the pH of the remaining electrolyzed water so as to fall within the physiologically neutral pH range, blending of the electrolyzed water having a high pH (alkaline) taken out and electrolyzed water having a low pH (acidic) may also be required. As a result, it is presumable that preparation of desired neutral electrolyzed water may become difficult as well as that the structure of the apparatus and handling thereof may become more and more complicated.

In the circumstances, it is desired to develop an electrolyzed water production apparatus and an electrolyzed water production method that can safely and simply produce electrolyzed water having a sustainable sterilizing action, pH in the physiologically neutral range (for example, weakly acidic, slightly acidic, neutral) and suitable for use in a living body, and, in addition, simultaneously with strong acidic electrolyzed water and strong alkaline electrolyzed water depending upon the structure.

Embodiments of the electrolyzed water production apparatus disclosed herein have an electrolyzer tank (container, chamber) for receiving or storing raw water for electrolysis, and at least one power supply. The raw water can be, for example, a salt solution. The electrolyzer tank has a plurality of electrode pairs therein, which are connected to the at least one power supply and have an anode and a cathode arranged with a diaphragm sandwiched between them. Note that, to the electrolyzer tank, a raw-water supply source such as a tank for storing raw water for electrolysis may be connected, if necessary, by way of, for example, a pipe having a flow-rate regulating valve, etc. When raw water is a mixture (for example, a salt solution containing water and common salt), supply sources for substances (materials) to be mixed may be connected to the raw-water supply source or the supply sources for substances (materials) may be connected to the electrolyzer tank.

In the electrolyzed water production apparatus thus constituted, a plurality of electrode pairs are arranged in the electrolyzer tank for receiving or storing to which the raw water (to be electrolyzed), and each electrode pair has an anode and a cathode separated by a diaphragm. Therefore, the interior of the electrolyzer tank is partitioned into a plurality of regions (chambers) by the diaphragms. Note that, each region may not be completely closed. If the electrolyzer tank has, for example, a rectangular planar shape and the electrode pairs are juxtaposed, for example, in a single direction, the electrolyzer tank is partitioned into the regions corresponding to the number of diaphragms+1. Alternatively, if the electrolyzer tank has, for example, a circular planar shape and the electrode pairs and diaphragms are arranged, for example, radially from the center of the electrolyzer tank, the electrolyzer tank is partitioned into regions corresponding to the number of diaphragms. At this time, in at least one region of the plurality of regions partitioned by diaphragms, the anode of one electrode pair of the plurality of electrode pairs and the cathode of another electrode pair are arranged so as to face each other without a diaphragm sandwiched between them or without a diaphragm interposed between them. Accordingly, in the region, the strong acidic electrolyzed water produced at the anode and the strong alkaline electrolyzed water produced at the cathode are appropriately mixed, more specifically, strong acidic electrolyzed water and strong alkaline electrolyzed water are mixed during electrolysis to obtain desired electrolyzed water having a liquid property, that is, pH of the physiologically neutral range (for example, weakly acidic, slightly acidic, neutral).

Alternatively, in embodiments of the electrolyzed water production apparatus disclosed herein, an electrolyzer tank may be partitioned into at least three regions by diaphragms of a plurality of electrode pairs. In at least one region of the at least three regions, the anode of one electrode pair of the plurality of electrode pairs and the cathode of another electrode pair of the plurality of electrode pairs may be arranged so as to face each other (with a diaphragm sandwiched between them). Even if the apparatus is constructed in this way, in at least one region of the at least three regions partitioned by diaphragms, the anode of one electrode pair of the plurality of electrode pairs and the cathode of another electrode pair are arranged so as to face each other without a diaphragm sandwiched between them or without a diaphragm interposed between them. Therefore, in the region, the strong acidic electrolyzed water produced at the anode and the strong alkaline electrolyzed water produced at the cathode are appropriately mixed to obtain electrolyzed water having a liquid property, that is, pH of physiologically neutral range (for example, weakly acidic, slightly acidic, neutral) during electrolysis.

Furthermore, in each of a plurality of electrode pairs, the anode and the cathode arranged so as to face each other may be arranged such that the distance between them can be controlled. It has been found that the current value during electrolysis can be significantly controlled by changing the distance between the anode and the cathode arranged so as to face each other in a region partitioned by a diaphragm, even if a constant voltage is applied, and the pH of electrolyzed water produced within the region can be appropriately controlled. To describe more specifically, since resistance increases by increasing, for example, the distance (keeping more distance) between the anode and the cathode of an electrode pair, even if a constant voltage is supplied to a plurality of electrode pairs, acidity on an anode side and alkalinity on the cathode side in the case where the anode and the cathode are arranged so as to face each other without the diaphragm interposed between them deviate from the equivalent values for attaining complete neutralization. Therefore, in the region, electrolyzed water having a desired pH of the physiologically neutral range (for example, weakly acidic, slightly acidic, neutral), in short, a wide variety types of electrolyzed waters having various pH values close to the physiological pH can be more simply produced.

Likewise, a current during electrolysis may be changed by controlling the distance between an anode and a cathode arranged so as to face each other, in addition or instead, by controlling supply of power (voltage) from a supply source to each electrode pair. Also in the case, the degree of the reaction (reaction amount, reaction rate) on the anode side, that is, acidity, and the degree of the reaction (reaction amount, reaction rate) on the cathode side, that is, alkalinity, when the anode and the cathode are arranged so as to face each other without a diaphragm interposed between them, can be significantly and desirably controlled. Even in this case, in the region, electrolyzed water having a desired pH in the physiologically neutral range (for example, weakly acidic, slightly acidic, neutral), in short, a wide variety types of electrolyzed waters having a pH close to the physiological pH can be more simply produced.

More specifically, in at least one region where the anode of one electrode pair of the plurality of electrode pairs and the cathode of another electrode pair of the plurality of electrode pairs are arranged so as to face each other, constitution may be made such that the reaction on the anode side of the one electrode pair and the reaction on the cathode side of the another electrode pair can be controlled to produce electrolyzed water having desired pH (or hydrogen ion concentration).

Specifically, as described above, a plurality of electrode pairs may be provided such that the distance between an anode and a cathode of each electrode pair can be controlled, and/or, constitution may be made such that the same power or voltage or a different power or voltage is applied to each of the plurality of electrode pairs by at least one power supply.

Furthermore, a plurality of electrode pairs may be connected to a single power supply to further simplify the structure of the apparatus, thereby further reducing the size of the apparatus.

Furthermore, from the foregoing, the electrolyzed water production apparatus disclosed herein has an electrolyzer tank for receiving or storing raw water for electrolysis and an power supply, and has two electrode pairs provided in the electrolyzer tank, connected to a power supply and having an anode and a cathode arranged so as to face each other with a diaphragm sandwiched between them. The electrolyzer tank is partitioned into three regions (three chambers) by the diaphragms of the two electrode pairs. In one region of the three regions, the anode of one electrode pair of the two electrode pairs and the cathode of the other electrode pair (of the two electrode pairs) may be arranged so as to face each other without a diaphragm sandwiched between them or a diaphragm interposed between them.

Furthermore, the electrolyzed water production method disclosed herein includes preparing an electrolyzer tank for receiving or storing raw water for electrolysis, supplying or storing the raw water in the electrolyzer tank, arranging a plurality of electrode pairs each composed of an anode and a cathode such that the anode and the cathode are arranged with a diaphragm sandwiched between them in the electrolyzer tank, supplying power to the plurality of electrode pairs, which are allowed to be in contact with the raw water, thereby electrolyzing the raw water for electrolysis.

In this case, a plurality of electrode pairs may be arranged such that the electrolyzer tank is partitioned into at least three regions (three chambers) by the diaphragms of the plurality of electrode pairs. In at least one region of the at least three regions, the plurality of electrode pairs may be arranged such that the anode of one electrode pair of the plurality of electrode pairs and the cathode of another electrode pair of the plurality of electrode pairs face each other without a diaphragm sandwiched between them or without a diaphragm interposed between them.

Furthermore, in at least one region where the anode of one electrode pair of the plurality of electrode pairs and the cathode of another electrode pair of the plurality of electrode pairs are arranged so as to face each other, the reaction on the anode side of the one electrode pair and the reaction on the cathode side of the another electrode pair may be controlled such that electrolyzed water having desired pH is produced.

Specifically, the distance between the anode and the cathode of each of the electrode pairs of the plurality of electrode pairs may be controlled and/or the same power or voltage or a different power or voltage may be applied to each of the plurality of electrode pairs.

Furthermore, from the foregoing, embodiments of the electrolyzed water production methods disclosed herein include preparing an electrolyzer tank for receiving or storing raw water for electrolysis, supplying or storing the raw water in the electrolyzer tank, arranging two electrode pairs each composed of an anode and a cathode in the electrolyzer tank so as to face each other with a diaphragm sandwiched between them to partition the electrolyzer tank into three regions by the diaphragms. Simultaneously, in one region of the three regions, the anode of one electrode pair of the two electrode pairs and the cathode of the other electrode pair of the two electrode pairs can be arranged so as to face each other without a diaphragm sandwiched between them or a diaphragm interposed between them and power may be supplied to the two electrode pairs, which are allowed to be in contact with the raw water to electrolyze the raw water for electrolysis.

DETAILED DESCRIPTION

Figure 1:
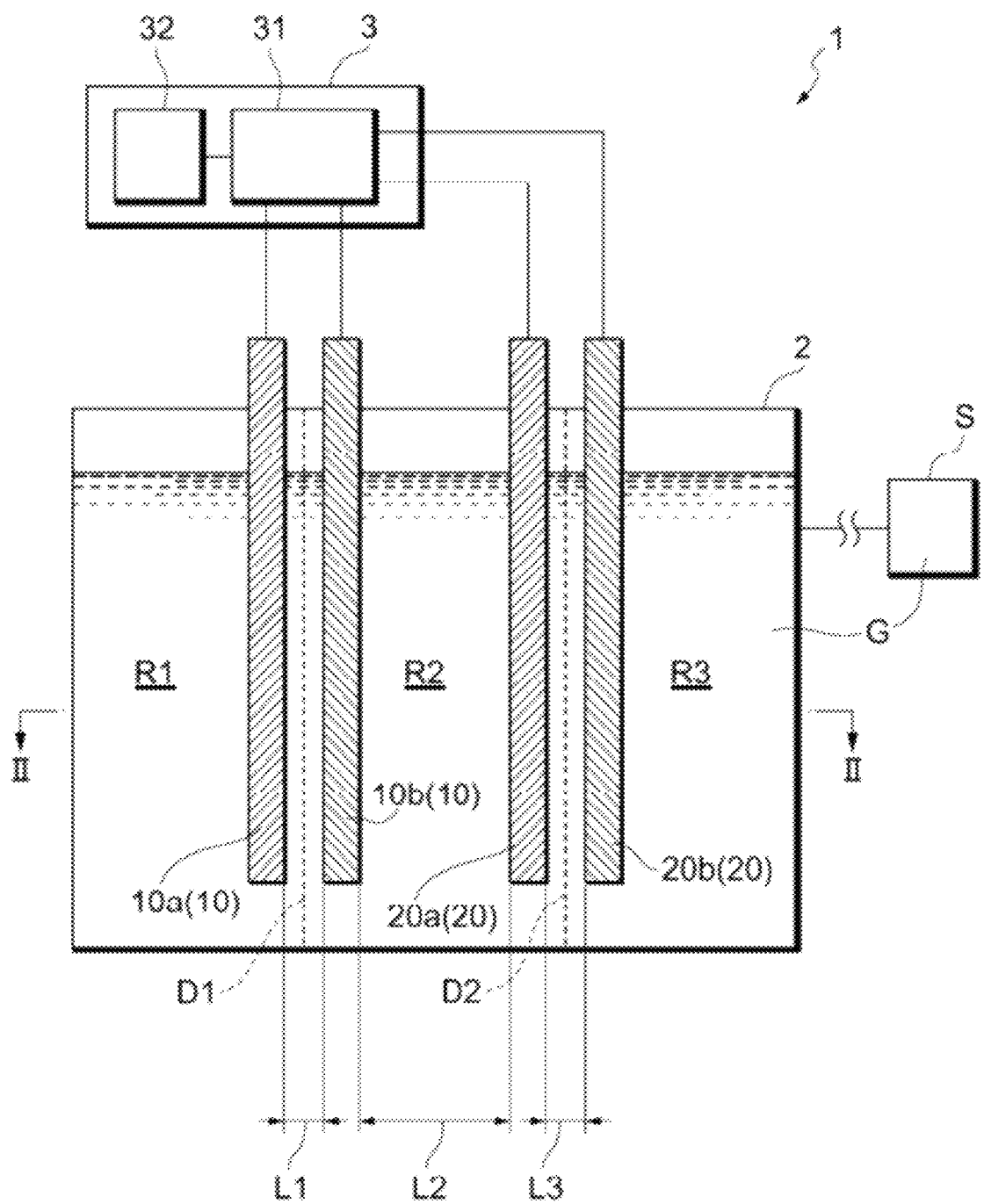
FIG. 1 is a schematic view (partly vertical cross-sectional view) showing the structure of an embodiment of the electrolyzed water production apparatus disclosed herein.

Embodiments of the disclosure will be described referring to the drawings. Note that, in the drawings, like reference numerals are used to designate like structural elements and any further explanation is omitted for brevity's sake. Furthermore, positional relationship such as the left, right, top and bottom are based on those of the drawing, unless otherwise specified. Furthermore, the dimensional ratios of the drawings are not limited to those of the drawings. Furthermore, the following embodiments are just examples for illustrating the disclosure, and should not be construed as limiting the disclosure to embodiments alone. Moreover, the disclosure can be modified in various ways without deviating from the gist thereof.

Figure 2:
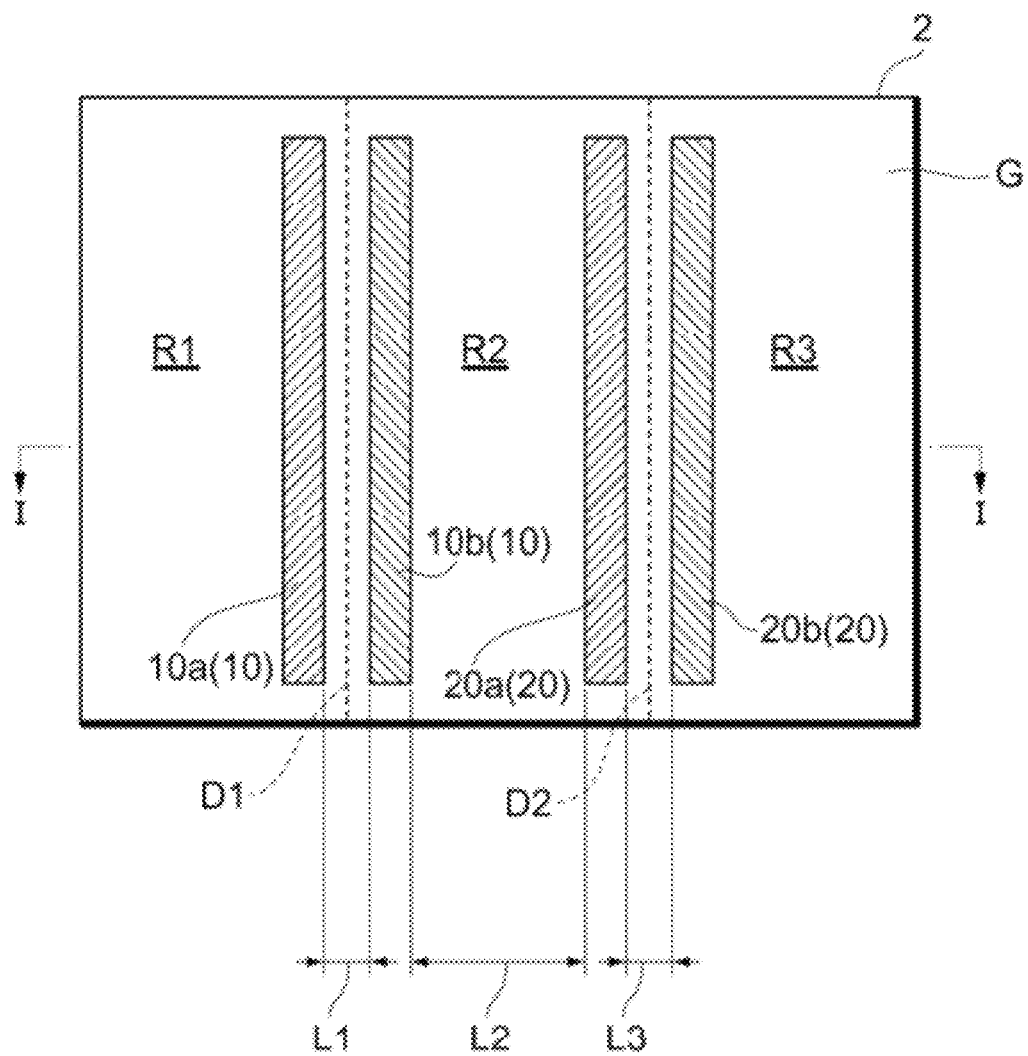
FIG. 2 is a schematic sectional view taken along the line II-II of FIG. 1.

FIG. 1 is a schematic view (partly vertical cross-sectional view) showing the structure of an embodiment of the electrolyzed water production apparatus disclosed herein and FIG. 2 is a schematic sectional view taken along the line II-II of FIG. 1. An electrolyzed water production apparatus 1, which has a shape, for example, a almost rectangular column with an end opened (for example, the upper end opened as is shown in the figure, in other words, with the lower end closed as is shown in the figure), has an electrolyzer tank 2 in which, for example, a dilute salt solution is supplied or stored as raw water G for electrolysis, and an power supply unit 3 (power source). To the electrolyzer tank 2, a raw-water supply source S storing raw water G is connected by way of a pipe having, for example, an appropriate flow-rate regulating valve (not shown).

Furthermore, the interior portion of the electrolyzer tank 2 is partitioned by two diaphragms D1, D2 into three regions (three chambers) R1, R2, R3. On the two sides of diaphragm D1 of these diaphragms D1, D2, an anode 10a and a cathode 10b (an electrode pair 10 is composed of these) are respectively provided. On the two sides of the diaphragm D2, an anode 20a and a cathode 20b (an electrode pair 20 is composed of these) are respectively provided. Likewise, in the electrode pair 10, the anode 10a and the cathode 10b are arranged with the diaphragm D1 sandwiched between them. Also, in the electrode pair 20, the anode 20a and the cathode 20b are arranged with the diaphragm D2 sandwiched between them. By virtue of such a structure, in the region R2 of the electrolyzer tank 2, the anode 20a and the cathode 10b are arranged so as to face each other without a diaphragm sandwiched between them or without a diaphragm interposed between them. Furthermore, as shown in FIG. 2, electrode pairs 10, 20 are positioned substantially in parallel, for example, in a shorter side of the electrolyzer tank 2 and juxtaposed in the longitudinal (extending) direction of the electrolyzer tank 2.

Furthermore, as shown in FIG. 1, anodes 10a, 20a and cathodes 10b, 20b of these electrode pairs 10, 20 are electrically connected to a current/voltage regulator 31 of the power supply unit 3. The current/voltage regulator 31 is electrically connected to a direct-current (DC) power supply 32 (this may be a power supply in the disclosure herein) that the power supply unit 3 has.

In the electrolyzer tank 2 (so-called three-chamber system or three-vessel system electrolyzer tank) partitioned into three regions R1, R2, R3 as mentioned above, when a power (voltage) is applied to each of the electrode pairs 10, 20, electrons are transferred between anodes 10a, 20a and cathodes 10b, 20b of the electrode pairs 10, 20 and the following reactions occur to electrolyze raw water G (dilute salt solution) for electrolysis.

[Anode (10a, 20a) Side]

$H_2O \rightarrow \tfrac{1}{2}O_2 + 2H^+ + 2e^-$ $2Cl^- \rightarrow Cl_2 + 2e^-$ $Cl_2(aq) + H_2O \Leftrightarrow HCl + HClO$ In this way, on the anode (10a, 20a) side, water ($H_2O$) is electrolyzed into hydrogen ion ($H^+$) and oxygen gas ($O_2$). Furthermore, chlorine gas ($Cl_2$) is generated from chlorine ions ($Cl^-$). Moreover, the chlorine gas ($Cl_2$) is reacted with water ($H_2O$) to reversibly produce hydrochloric acid (HCl) and hypochlorous acid (HClO). Consequently, strong acidic electrolyzed water (SAEW) produces. Note that, in the above formula, a symbol "$\Leftrightarrow$" indicates that the reaction is reversible (the same shall apply hereinafter).

[Cathode (10b, 20b) Side]

$H_2O + 2e^- \rightarrow \tfrac{1}{2}H_2 + OH^-$ $Na^+ + OH^- \Leftrightarrow NaOH$ On the other hand, on the cathode (10b, 20b) sides, water ($H_2O$) is electrolyzed to generate hydrogen gas ($H_2$) and hydroxide ion ($OH^-$). Furthermore, sodium ion ($Na^+$) reacts with the hydroxide ion ($OH^-$) to reversibly produce sodium hydroxide (NaOH). Consequently, strong alkaline electrolyzed water produces.

More specifically, in the region R1 of the electrolyzer tank 2, strong acidic electrolyzed water is produced by the reaction on the anode (10a) side of the electrode pair 10 and gradually accumulated, whereas in the region R3 of the electrolyzer tank 2, strong alkaline electrolyzed water is produced by the reaction on the cathode (20b) side of the electrode pair 20 and gradually accumulated. On the other hand, in the region R2 of the electrolyzer tank 2, hydrochloric acid (HCl) and hypochlorous acid (HClO)/hydrogen ion ($H^+$) produced on the anode (20a) side of the electrode pair 20 are neutralized by sodium hydroxide (NaOH)/hydroxide ion ($OH^-$) produced on the cathode (10b) side of the electrode pair 10 to produce neutral-range electrolyzed water, which is gradually accumulated. Therefore, according to the electrolyzed water production apparatus 1, it is possible to safely and simply produce electrolyzed water having a sustainable sterilizing action and pH in the physiologically neutral range and suitable for use in a living body, and simultaneously with strong acidic electrolyzed water and strong alkaline electrolyzed water by using a single electrolyzer tank 2 of a simple structure having two electrode pairs 10, 20. From these, the regions R1, R2, R3 of the electrolyzer tank 2 can be mentioned as an anode-side electrolyzer tank, a middle electrolyzer tank and a cathode-side electrolyzer tank, respectively. In view of this, the electrolyzer tank 2 may be said as a three chamber system or three vessel system electrolyzer tank.

Figure 3:
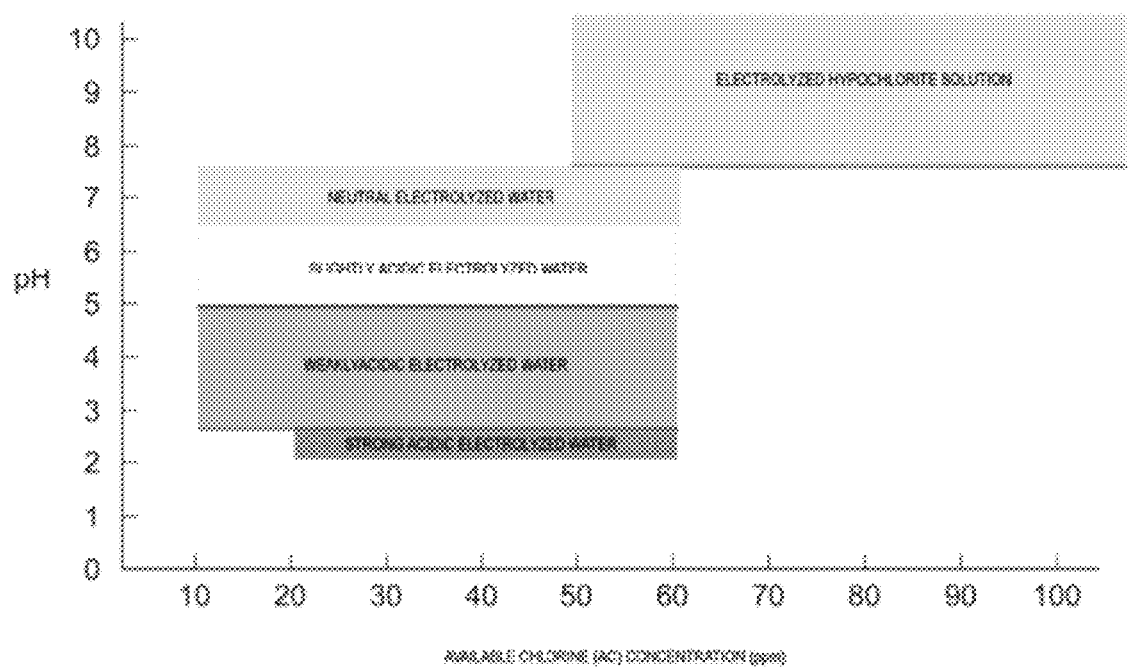
FIG. 3 is a state diagram showing an example of classification of electrolyzed water in the relationship between pH of electrolyzed water and available chlorine (AC) concentration.

Note that, "electrolyzed water" as used herein, is a general term of aqueous solutions obtained by subjecting, for example, city water and the aforementioned dilute salt solution to direct-current electrolysis performed in an electrolyzer tank. Various types of electrolyzed waters can be produced depending upon the difference in electrolyzed water production apparatus and electrolysis system. Such electrolyzed waters are sometimes classified as shown in FIG. 3 based on the pH and available chlorine (AC) concentration.

Furthermore, more specifically, individual electrolyzed waters shown in FIG. 3 can be defined as follows (however, not limited to these).

[Strong Acidic Electrolyzed Water (SAEW)]

This refers to an acidic (pH: 2.2 to 2.7) aqueous solution containing hypochlorous acid produced on the anode side, as a main component, when a salt solution (NaCl concentration 0.1% or less) containing a small amount of common salt (sodium chloride having a NaCl purity of 99.9% or more and containing no additives) in city water, which primarily satisfies the requirements defined in "City Water, Section 4 (water-quality standard)", is electrolyzed in a diaphragm electrolyzer tank such as an electrolyzer tank 2. Note that, hypochlorous acid produces when chlorine gas is dissolved and can be present as a free chlorine in the state of chlorine gas ($Cl_2$), hypochlorous acid (HClO) and hypochlorous acid ion ($ClO^-$) depending upon the pH of the solution. HClO and $ClO^-$ both have sterilizing power; however the sterilizing power of HClO tends to overwhelmingly be strong compared to that of $ClO^-$.

[Strong Alkaline Electrolyzed Water]

This refers to an alkaline (pH: 11 to 11.5) aqueous solution containing sodium hydroxide (NaOH) produced on the cathode side as a main component when a salt solution (NaCl concentration 0.1% or less) containing a small amount of common salt in the aforementioned city water is electrolyzed in a diaphragm electrolyzer tank, similarly to the strong acidic electrolyzed water (SAEW).

[Electrolyzed Hypochlorite Solution]

This refers to an alkaline (pH: 7.5 or more) aqueous solution containing sodium hypochlorite (NaClO) as a main component, which is produced by a reaction between chlorine ($Cl_2$) generated on the anode side and sodium hydroxide (NaOH) produced on the cathode side, when a salt solution (NaCl concentration 0.1% or less) containing a small amount of common salt in the aforementioned city water is electrolyzed in a non-diaphragm electrolyzer tank.

[Weakly Acidic Electrolyzed Water]

This refers to electrolyzed water exhibiting weakly acidity of pH 2.7 to 5.0 and produced by the reaction between chlorine ($Cl_2$) generated on the anode side and sodium hydroxide (NaOH) produced on the cathode side when a salt solution (NaCl concentration 0.1% or less) containing a small amount of common salt in the aforementioned city water is electrolyzed in a non-diaphragm electrolyzer tank.

[Slightly Acidic Electrolyzed Water]

This refers to electrolyzed water exhibiting slight acidity of pH 5.0 to 6.5 and produced by the reaction between chlorine ($Cl_2$) generated on the anode side and sodium hydroxide (NaOH) produced on the cathode side when a salt solution (NaCl concentration 0.1% or less) containing a small amount of common salt in the aforementioned city water is electrolyzed in a non-diaphragm electrolyzer tank.

[Neutral Electrolyzed Water]

Generally, neutral electrolyzed water is not particularly defined unlike the cases of strong acidic electrolyzed water (SAEW) and strong alkaline electrolyzed water. In the disclosure herein, as an example, electrolyzed water within the range of pH 6.5 to 7.5 based on the standard reference of electrolyzed waters shown in FIG. 3 is defined as neutral electrolyzed water.

The properties of these electrolyzed waters are collectively shown in Table 1. Note that, in the table, "oxidation-reduction potential" (ORP) refers to the amount showing the intensity of oxidizing power (or reducing power) of a solution. The larger the positive value of ORP, the stronger the oxidizing power. Furthermore, ORP values of weakly acidic electrolyzed water, slightly acidic electrolyzed water, neutral electrolyzed water and electrolyzed hypochlorite solution are not generally defined. Furthermore, "available chlorine (AC) concentration" refers to the total concentration of chlorines contained in free chlorine and binding-form chlorine, and generally represents the concentration of chlorine effectively involved in sterilization. When chlorine is dissolved in water herein, it tends to be converted into chlorine gas ($Cl_2$), hypochlorous acid (HClO) and hypochlorous acid ion ($ClO^-$). These are collectively referred to as "free chlorine". Furthermore, when chlorine reacts with a nitrogen compound, etc., three form chemical species, namely, monochloramine ($NH_2Cl$), dichloramine ($NHCl_2$) and trichloramine ($NHCl_3$) tend to produce. These are collectively referred to as binding-form chlorine.

TABLE 1

| Electrolyzed water | Electrolysis system | pH | Oxidation-reduction potential ORP (mV) | Available chlorine concentration AC (ppm) |
|---|---|---|---|---|
| SAEW | Diaphragm Anode | 2.2~2.7 | 1100 | 20~60 |
| Strong alkaline electrolyzed water | Diaphragm Cathode | 11~11.5 | −900 | 0 |
| Weakly acidic electrolyzed water | Non-diaphragm pH adjuster | 2.7~5 | — | 10~60 |
| Slightly acidic electrolyzed water | Non-diaphragm pH adjuster | 5.0~6.5 | — | 10~60 |
| Neutral electrolyzed water | Non-diaphragm pH adjuster | 6.5~7.5 | — | 10~60 |
| Electrolyzed hypochlorite solution | Non-diaphragm | 8~ | — | 60~100 |

[Experimental Production of Electrolyzed Water Production Apparatus 1]

Next, using an experimental apparatus, which was manufactured so as to realize the structure of the electrolyzed water production apparatus 1, electrolyzed waters were produced. The properties of the electrolyzed water in the regions R1, R2, R3 of the electrolyzer tank 2 were evaluated. As the electrolyzer tank 2, for example, a rectangular columnar container (about 200 mm×about 300 mm×about 60 mmh) made of acryl was prepared. The distance L1 between the anode 10a and the cathode 10b of the electrode pair 10, the distance L2 between the cathode 10b of electrode pair 10 and the anode 20a of the electrode pair 20, and the distance L3 between the anode 20a of the electrode pair 20 and the cathode 20b of the electrode pair 20 were appropriately changed (for example, in the case where the electrolyzer tank 2 has the aforementioned size, distance L1=about 60 to about 90 mm, distance L2=about 60 to about 90 mm, distance L3=about 60 to about 90 mm). By changing at least one of the distances L1, L2, L3, even if a constant voltage is applied to electrode pairs 10, 20, neutral-range electrolyzed water having a desired pH, more specifically any one of the weakly acidic electrolyzed water, slightly acidic electrolyzed water and neutral electrolyzed water mentioned above can be obtained in the region R2.

Note that, the materials for the anodes 10a, 20a and the cathodes 10b, 20b are not particularly limited. For example, a conductive material such as a titanium platinum coating material was used. Furthermore, materials for the diaphragm D1 between the anode 10a and the cathode 10b of the electrode pair 10 and the diaphragm D2 between the anode 20a and the cathode 20b of the electrode pair 20 are not particularly limited. For example, a silicon resin and glassine are mentioned. Furthermore, the same material as that of the electrolyzer tank 2, for example, an acrylic plate, was used for immobilizing the electrode pairs 10, 20 and an appropriate resin material (for example, polypropylene) was used for immobilizing the diaphragms D1 and D2.

Furthermore, the power supply unit 3 is not particularly limited. For example, a commercially available power supply (alternate current standard value: 100V) was used and converted to a direct-current by an AC-DC converter and used as the power supply 32. This was fed to the electrolyzer tank 2 while controlling the current by a current/voltage regulator 31 (to apply a power or a voltage to the electrode pairs 10, 20). In this case, when different powers or voltages are applied to the electrode pairs 10, 20, neutral-range electrolyzed water having a desired pH, more specifically, any one of the aforementioned weakly acidic electrolyzed water, slightly acidic electrolyzed water and neutral electrolyzed water can be obtained in the region R2.

Furthermore, as the raw water G for electrolysis, for example, the aforementioned dilute salt solution was used. In the experimental conditions as mentioned above, the electrolyzed water production apparatus 1 was operated to electrolyze the raw water G for electrolysis in each of the regions R1, R2, R3 in the electrolyzer tank 2. At this time, an intake (or "intake pipe") having an appropriate valve was provided to each of the regions R1, R2, R3 of the electrolyzer tank 2 and physical properties of electrolyzed waters obtained in the regions R1, R2, R3 were evaluated.

[Evaluation of Physical Properties of Electrolyzed Waters]

At the time points of 5 minutes, 10 minutes, and 15 minutes from initiation of electrolysis, each electrolyzed water was taken and measured for pH, available chlorine (AC) concentration and oxidation-reduction potential (ORP). A pH meter (for example, D-55 manufactured by Horiba, Ltd.) was used for measuring pH and ORP.

Furthermore, absorptiometry was used for measuring AC concentration. In this case, a blank to be used as a standard of available chlorine (AC) concentration measurement was prepared. The blank was prepared by first dispensing an appropriate amount of phosphate buffer (for example, No. 161-20185 manufactured by Wako Pure Chemical Industries Ltd.) to a test tube by a micropipette and adding appropriate amounts of diethyl-p-phenylenediamine (DPD) reagent powder (for example, No. 042-28002 manufactured by Wako Pure Chemical Industries Ltd.), potassium iodide (KI: for example, No. 164-03972, manufactured by Wako Pure Chemical Industries Ltd.) and distilled water, and mixing them. After the DPD reagent powder was dissolved, a predetermined amount of blank was placed in a glass cell or a quartz cell and set in an absorptiometer (for example, a spectrophotometer for ultraviolet and visible region, UV-1700 manufactured by Shimadzu Corporation). Next, the same amount of phosphate buffer was dispensed to a colorimetric tube by a micropipette. To this, the same amount of DPD reagent powder, an appropriate amount of electrolyzed water and the same amount of potassium iodide were added, mixed and allowed to stand for appropriate time to obtain a colorimetric solution for measurement. A predetermined amount of colorimetric solution was placed in a glass cell or a quartz cell and set in the same absorptiometer. The absorbance (ABS) at, for example, 511 nm exhibiting a maximum absorption was measured. From the resultant absorbance value and a calibration curve previously prepared, the available chlorine (AC) concentration of each electrolyzed water was obtained.

Figure 4:
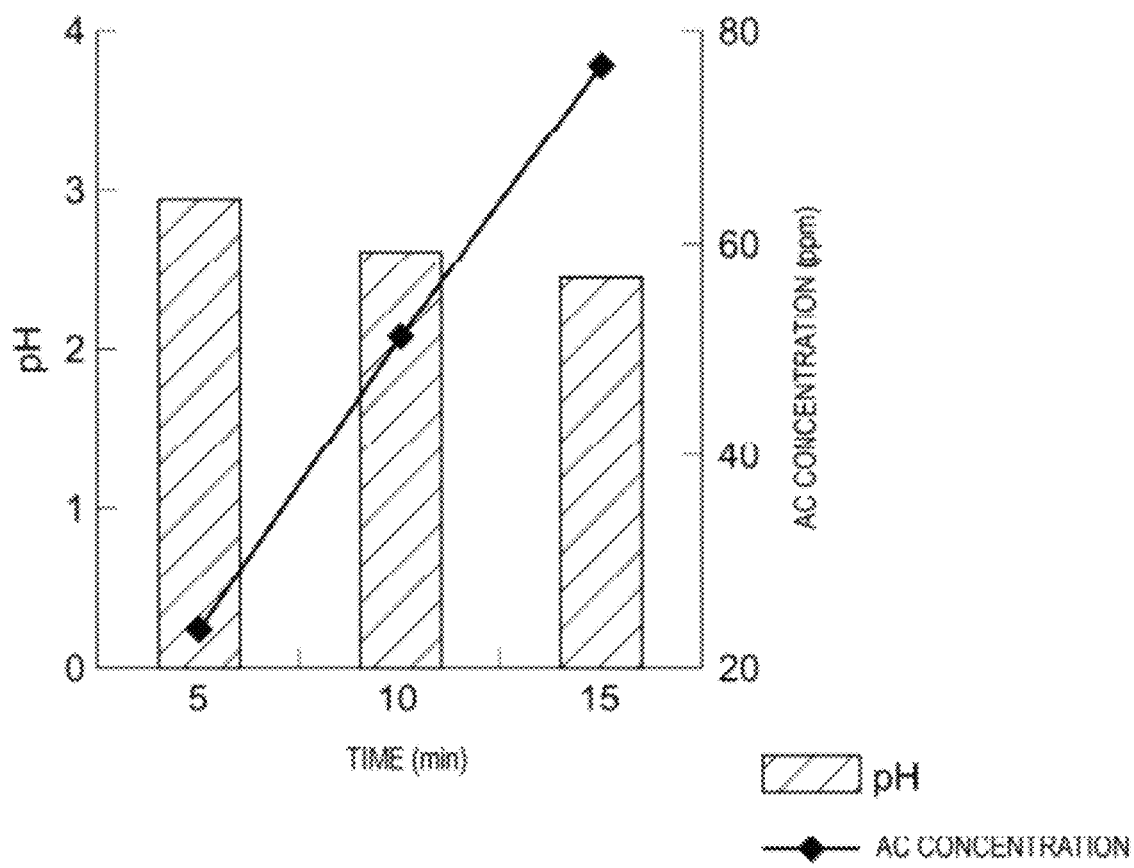
FIG. 4 is a graph showing the relationship between the pH and the AC concentration of strong acidic electrolyzed water obtained in the region R1, which is an anode-side electrolyzer tank, with electrolysis time.
Figure 5:
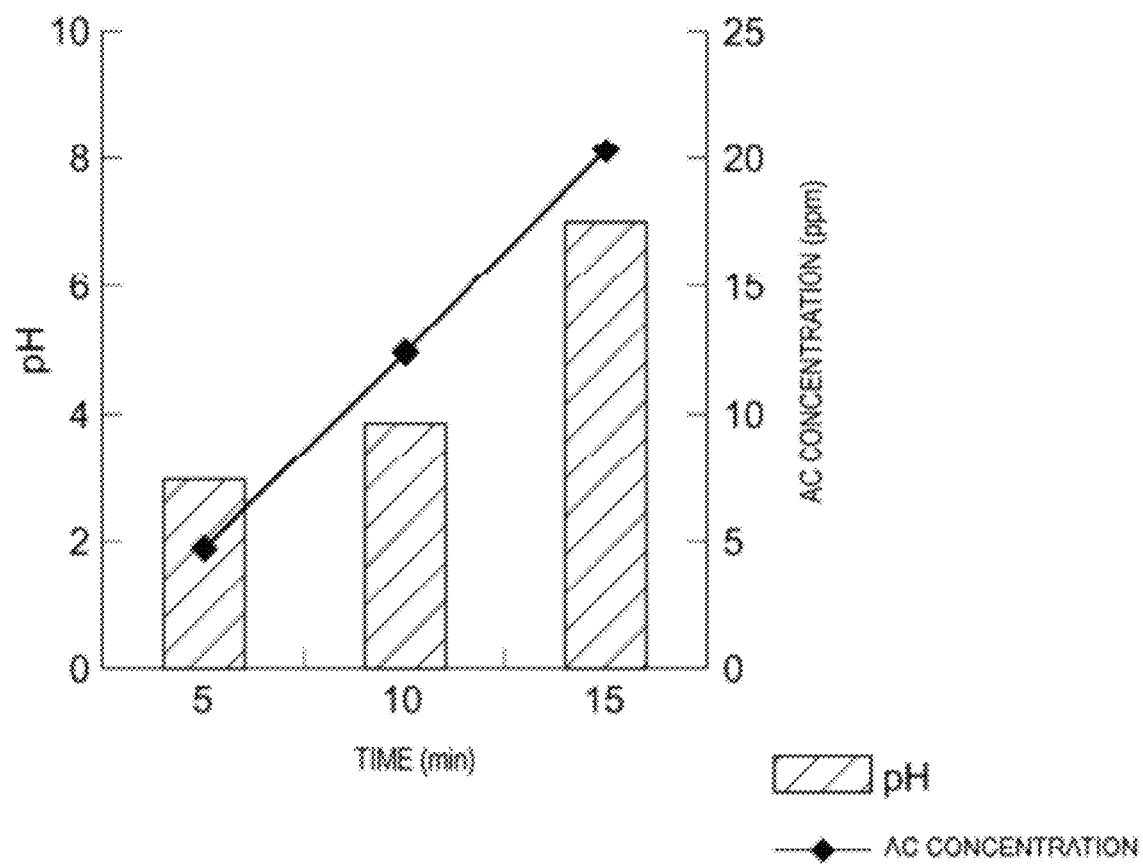
FIG. 5 is a graph showing the relationship between the pH and the AC concentration of neutral-region electrolyzed water obtained in the region R2, which is a middle electrolyzer tank, with electrolysis time.
Figure 6:
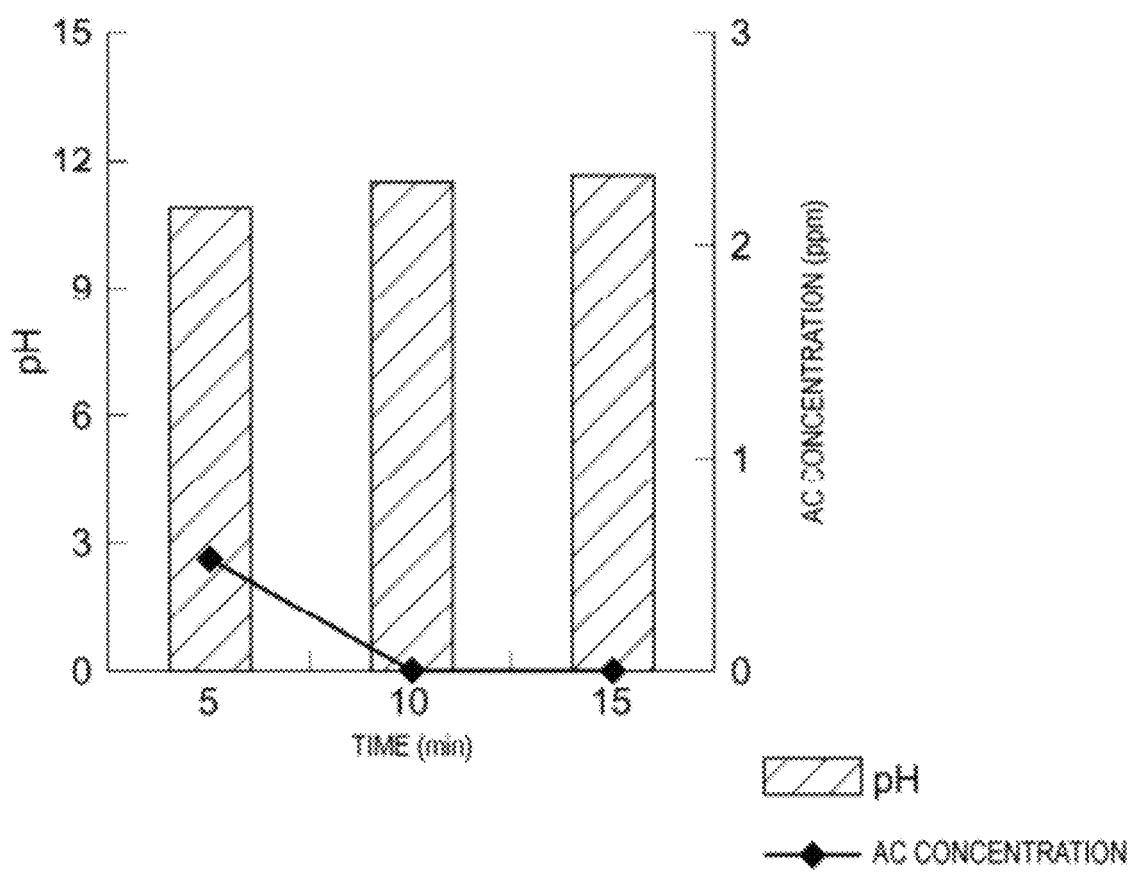
FIG. 6 is a graph showing the relationship between the pH and the AC concentration of strong alkaline electrolyzed water obtained in the region R3, which is a cathode-side electrolyzer tank, with electrolysis time.
Figure 7:
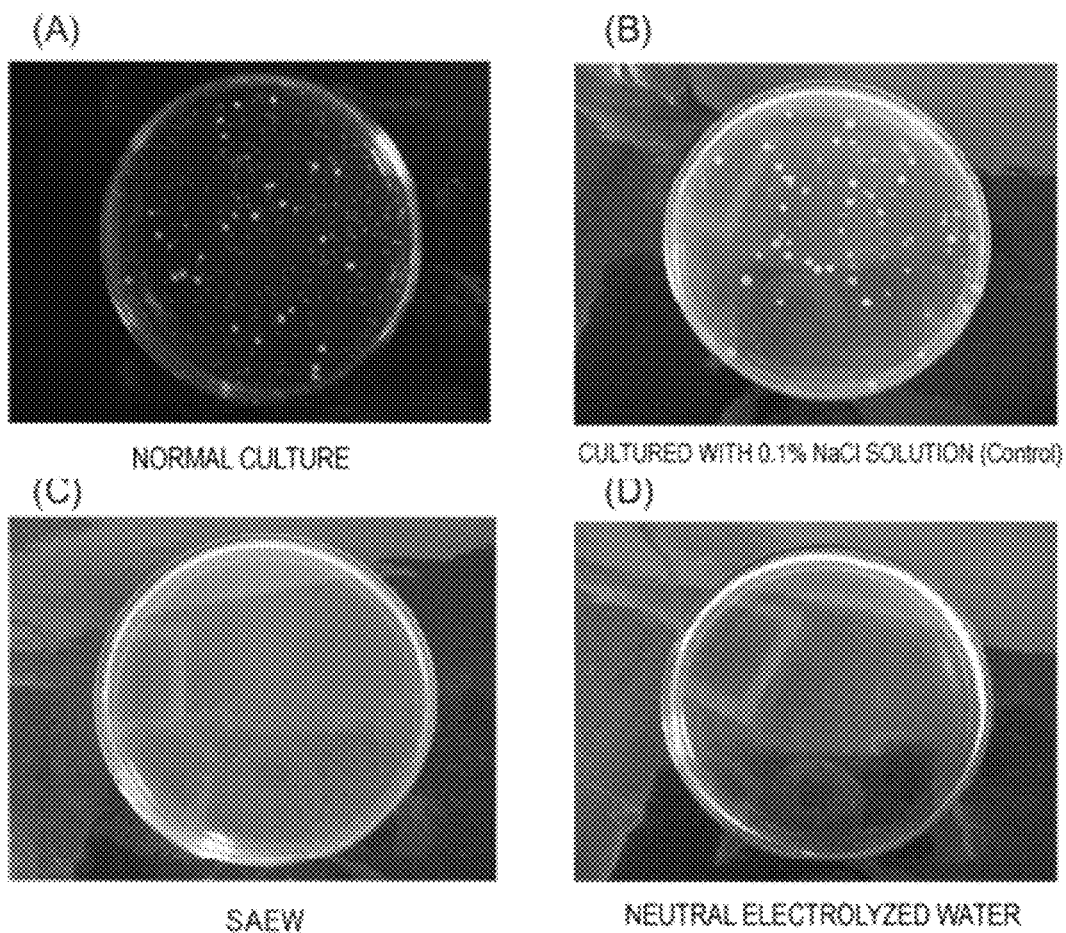
FIGS. 7(A) to (D) are respectively photographs (taken from the above) of a dish showing the state where *Staphylococcus aureus* colonies are formed by general culturing, a dish showing the state where *Staphylococcus aureus* colonies are formed by culturing the bacterium using a 0.1% salt solution (raw water G for electrolysis), a dish showing the state where *Staphylococcus aureus* was tried to be cultured by blending strong acidic electrolyzed water (SAEW), and a dish showing the state where *Staphylococcus aureus* was tried to be cultured by blending neutral electrolyzed water.

Of the obtained measurement results of electrolyzed waters, pH and available chlorine (AC) concentration are shown together in FIG. 4 to FIG. 6. FIG. 4 is s a graph showing the relationship between the pH and the AC concentration of strong acidic electrolyzed water obtained in the region R1, which is an anode-side electrolyzer tank, with electrolysis time. FIG. 5 is a graph showing the relationship between the pH and the AC concentration of neutral-region electrolyzed water obtained in the region R2, which is a middle electrolyzer tank, with electrolysis time. FIG. 6 is a graph showing the relationship between the pH and the AC concentration of strong alkaline electrolyzed water obtained in the region R3, which is a cathode-side electrolyzer tank, with electrolysis time. At this time, a current value was monitored at the anode (10a, 20a) sides and cathode (10b, 20b) sides. As a result, it was confirmed that the current value virtually linearly increases gradually with the passage of time at both sides. From these results, it was confirmed that pH and available chlorine (AC) concentration change with the passage of electrolysis time in strong acidic electrolyzed water (FIG. 4), neutral-range electrolyzed water (FIG. 5) and strong alkaline electrolyzed water (FIG. 6).

[Effect of Sterilizing Action by Electrolyzed Water]

Next, the obtained strong acidic electrolyzed water (SAEW) and neutral-range electrolyzed water (neutral electrolyzed water was used herein) were evaluated for a sterilizing action on a microorganism. Furthermore, as an example of the microorganism, a bacterial suspension of *Staphylococcus aureus* (*S. aureus*) was prepared. First, a *Staphylococcus aureus* strain conserved in Casitone medium (for example, E-MP77 strain manufactured by Eiken Chemical Co., Ltd.) was taken by a platinum loop and smeared onto a flat surface of a standard agar medium (for example, MB6500 Pearl Core standard agar medium, manufactured by Eiken Kizai Co., Ltd.), thereafter, cultured in an incubator, for example, at 38° C. for 48 hours to reproduce bacterial cells. Then, from the bacterial colonies formed on the flat surface of the standard agar medium, a single colony was picked up by a platinum loop and added to for example, 9 ml of a sterilized dilution water. Note that, *S. aureus* is a gram-positive micrococcus having an irregularly-aligned grape-cluster shape and widely distributed on the skin and the mucous membrane of healthy persons, that is, one of the normal bacteria floras present on human nose and skin surface. However, when the bacteria are proliferated on food, heat resistant enterotoxin is produced, which sometimes causes food poisoning. Of *S. aureus*, methicillin-resistant *S. aureus* (MRSA) is known to cause in-hospital infection, etc.

The concentration of bacterial cells was measured as follows. First, an appropriate amount of bacterial suspension was taken and serially diluted 10 fold. The concentration of bacterial cells in the diluted bacterial suspension was measured by a so-called standard plate count method. In the dilution at this time, appropriate sterilized dilution water (for example, TP2000 manufactured by Eiken Kizai) can be used. The viable cell number herein, which is used as a hygiene indicator for evaluating hygienic quality of food or a pollution indicator for evaluating environmental sanitation management, represents the number of mesophile bacterial cells grown on a standard agar medium under aerobic conditions. This is also called as general viable cell count or standard plate count (SPC). In the Food Sanitation Law, the standard plate count method (official method) is specified. A sample stock solution was serially diluted 10 folds with sterilized dilution water sequentially to prepare a diluted sample solution. When bacterial cell numbers cannot be estimated, dilution is generally performed to $10^5$ to $10^6$. Generally two dishes are prepared for the same dilution stage. Each diluted sample solution (for example, 1 ml) is dispensed to each of the dishes. Thereafter, to the dishes, a standard agar medium (for example, about 15 to 20 ml), which is sterilized under high pressure vapor in advance and thereafter stored at, for example, 45 to 50° C., is poured, immediately mixed so as to sufficiently mix the diluted sample solution and the medium, and allowed to stand still until the medium is completely hardened. Then, aerobic culture was performed in an incubator at for example, 37° C. for 24 hours. Finally, the standard plate count of a dish having 30 to 300 bacterial colonies is obtained.

Next, an appropriate amount of diluted bacterial suspension mentioned above and an appropriate amount of strong acidic electrolyzed water (SAEW) produced in the region R1 on the anode-side electrolyzer tank of the electrolyzer tank 2 are mixed. Thereafter, an appropriate amount of solution mixture is taken and placed in sterilized dish (for example, sterilized dish 90 manufactured by Sekisui Chemical Co., Ltd.) and mixed with a general agar liquid medium (for example, Pearl Core standard agar medium MB6500 manufactured by Eiken Kizai) maintained at about 40° C. in an incubator (for example, THEMO MAX TM-1 manufactured by AS ONE Corporation). Thereafter, the dish was cultured in an incubator, for example, at 38° C. for 48 hours. Then, two days later, bacterial cell colonies were counted by the standard plate count method. In the same manner, bacterial cells were cultured by using neutral electrolyzed water produced in the region R2, which is a middle electrolyzer tank of the electrolyzer tank 2, in place of the strong acidic electrolyzed water, and bacterial cells were counted. Furthermore, bacterial cells were cultured by using a 0.1% salt solution (raw water G for electrolysis) in place of the strong acidic electrolyzed water and bacterial cells were counted. The results obtained are collectively shown in Table 2. Note that, in the table, "CFU" stands for the "colony forming unit" of bacterial cells.

TABLE 2

| Electrolyzed water | *S. aureus* (CFU/ml) |
| --- | --- |
| General culture | $68.0 \times 10^5$ |
| Control (0.1% NaCl) | $98.0 \times 10^5$ |
| SAEW | 0 |
| Neutral electrolyzed water | 0 |

Furthermore, FIGS. 7(A) to (D) are respectively photographs (taken from the above) of a dish showing the state where *Staphylococcus aureus* colonies are formed by general culturing, a dish showing the state where *Staphylococcus aureus* colonies are formed by culturing the bacterium using a 0.1% salt solution (raw water G for electrolysis), a dish showing the state where *Staphylococcus aureus* was tried to be cultured by blending strong acidic electrolyzed water (SAEW), and a dish showing the state where *Staphylococcus aureus* was tried to be cultured by blending neutral electrolyzed water. From these results, in the cases where strong acidic electrolyzed water (SAEW) and neutral electrolyzed water are blended, *Staphylococcus aureus* are rarely proliferated (cultured). It was confirmed that both strong acidic electrolyzed water (SAEW) and neutral electrolyzed water exert an excellent sterilizing action on microorganisms such as *Staphylococcus aureus*.

Furthermore, it was confirmed that strong acidic electrolyzed water (SAEW) and neutral-range electrolyzed water obtained by the disclosure herein had an excellent sterilizing action on other bacteria besides *Staphylococcus aureus*, for example, *Bacillus cereus* (*B. cereus*). Note that, *B. cereus*, which is a large gram-positive *bacillus* having endospores, is widely distributed in the natural world including soil, grit and dust and likely to form a chain. Furthermore, *B. cereus* may possibly cause opportunistic infection, sepsis, meningitis and bronchial pneumonia, etc. Also, food poisoning caused by toxin produced by *B. cereus* is known. The food poisoning is roughly divided into two clinical types: one is a diarrhea type (frequently observed outside Japan), in which diarrhea and abdominal pain occur with a latent period of 8 to 16 hours, and a vomiting type (frequently observed in Japan), in which vomiting predominantly occurs with a latent period of 1 to 5 hours.

According to the electrolyzed water production apparatus 1 thus constituted and disclosed herein and the electrolyzed water production method using the apparatus and disclosed herein, a single electrolyzer tank 2 is partitioned into three regions R1, R2, R3 by the diaphragms D1, D2 and each region serves as an electrolyzer tank, and more specifically constitutes a three-chamber or three-vessel system electrolyzed water production apparatus. In the region R2 serving as the middle electrolyzer tank, neutral-range electrolyzed water is naturally produced during electrolysis. Therefore, various types of electrolyzed waters (for example, weakly acidic electrolyzed water, slightly acidic electrolyzed water, neutral electrolyzed water) having a sustainable sterilizing action and pH of the physiologically neutral range and suitable for use in living body can be desirably, safely and simply produced by an apparatus having an extremely simple structure, and in addition, strong acidic electrolyzed water in the region R1 and strong alkaline electrolyzed water in the region R3 can be simultaneously produced.

Therefore, a pH adjuster which has been used in the art in order to obtain neutral-range electrolyzed water is no longer required. A time-consuming and complicated process, additionally performed after strong acidic electrolyzed water and strong alkaline electrolyzed water are produced, for mixing them and adjusting pH to a desired value, is no longer required. As a result, the maintenance of the apparatus is simplified and handling can be improved; at the same time, the number of steps for producing neutral-range electrolyzed water such as weakly acidic electrolyzed water, slightly acidic electrolyzed water and neutral electrolyzed water, and production cost thereof can be significantly reduced. Furthermore, since neutral-range electrolyzed water having desired pH can be easily obtained as described above, electrolyzed water can be applied various usages for example, cleansing/sterilization in the medical field, sterilization of wound, gargling, hand-cleansing, sterilization of food materials, cleansing/sterilization of kitchen utensils and cooking utensils, and cleansing/sterilization of a toilet bowl, in ordinary home. Likewise, the disclosure herein can contribute to wide spreading of electrolyzed water in the world.

Note that, as mentioned above, the disclosure herein should not be limited to individual embodiments and can be modified as appropriately described in the foregoing in various ways as long as the gist of the disclosure is not changed. For example, the shape of the electrolyzer tank 2 is not limited to a rectangular column, and may be for example, a circular cylinder with an end opened (or an end closed).

Figure 8:
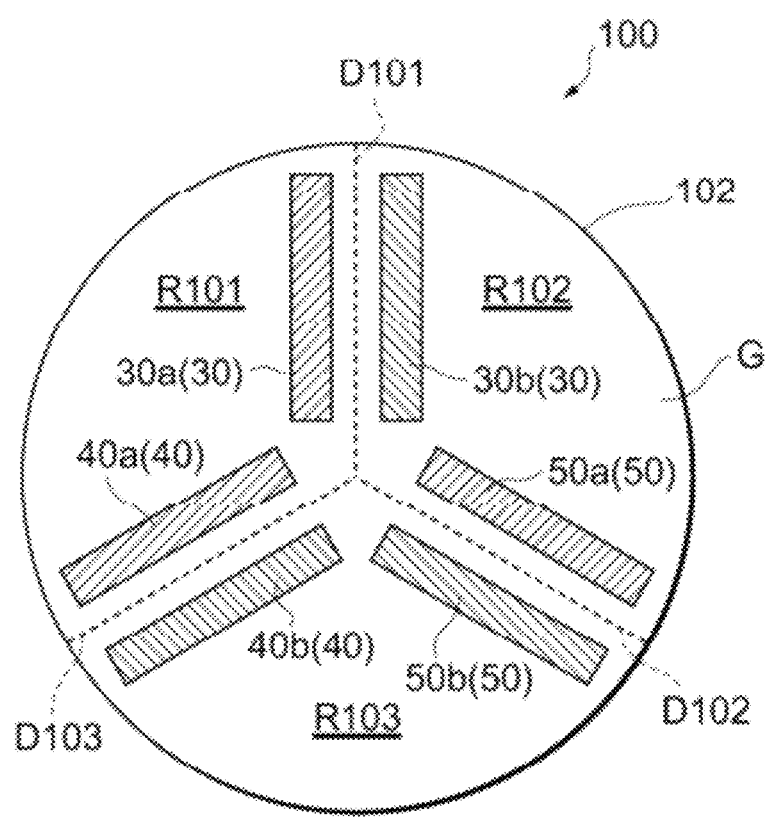
FIG. 8 is a schematic plane-sectional view showing a part of the structure of the electrolyzed water production apparatus (electrolyzer) according to another embodiment disclosed herein.
Figure 9:
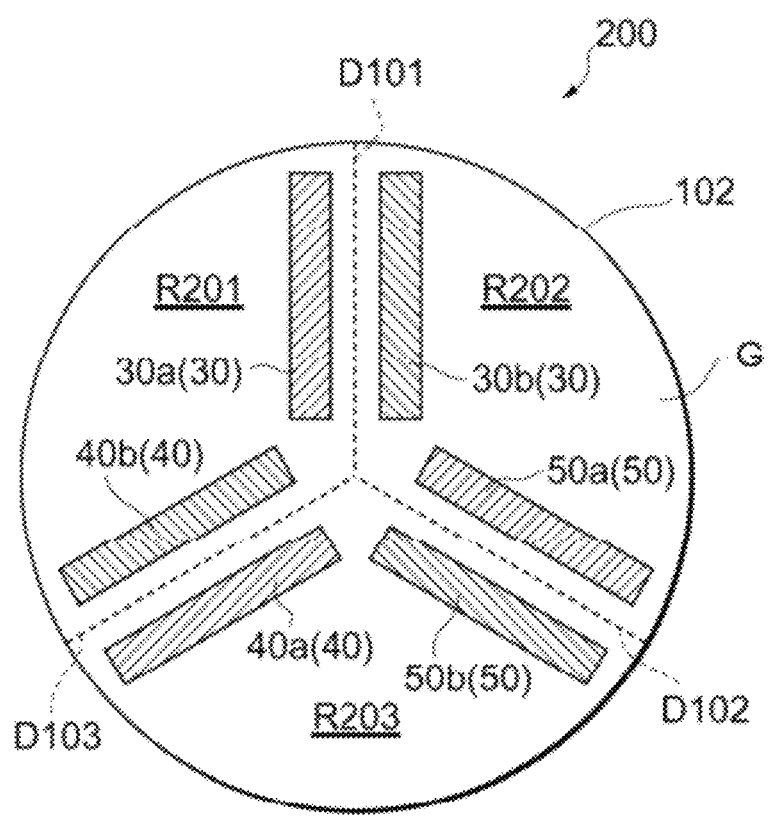
FIG. 9 is a schematic plane-sectional view showing a part of the structure of the electrolyzed water production apparatus (electrolyzer) according to another embodiment disclosed herein.

In the disclose herein, FIG. 8 and FIG. 9 are each a schematic plane-sectional view showing a part of the structure of the electrolyzed water production apparatus (electrolyzer) according to another embodiment disclosed herein. An electrolyzed water production apparatus 100 shown in FIG. 8 is constituted in the same manner as in electrolyzed water production apparatus 1 shown in FIG. 1 and FIG. 2 except that an electrolyzer tank 102 is provided in place of the electrolyzer tank 2 (therefore, the power supply unit 3, etc. are not shown). The electrolyzer tank 102 is a cylindrical container with an end opened (or closed) as described above. The interior thereof is partitioned by diaphragms D101, D102, D103. The three regions R101, R102, R103 thus partitioned have, for example, a flat fan shape having a center angle of about 120° as shown in the figure. Furthermore, in the electrolyzer tank 102, three electrode pairs 30, 40, 50 are provided. An anode 30*a* and a cathode 30*b* of the electrode pair 30, an anode 40*a* and a cathode 40*b* of the electrode pair 40, and an anode 50*a* and a cathode 50*b* of the electrode pair 50 are arranged so as to sandwich diaphragms D101, D102, and D103, respectively.

According to the electrolyzed water production apparatus 100 thus constituted, in the region R101 of the electrolyzer tank 102, strong acidic electrolyzed water (SAEW) is preferentially (predominantly) produced. In the region R102 where the anode 50*a* and the cathode 30*b* are arranged so as to face each other without a diaphragm between them, neutral-range electrolyzed water (more specifically, weakly acidic electrolyzed water, slightly acidic electrolyzed water, neutral electrolyzed water) is preferentially produced. In the region R103, strong alkaline electrolyzed water can be preferentially produced. Furthermore, since the structure of the apparatus is simple and the electrolyzer tank 102 has cylindrical shape, installation area can be further reduced.

On the other hand, the electrolyzed water production apparatus 200 shown in FIG. 9 has the same structure as that of the electrolyzed water production apparatus 100 shown in FIG. 8 except that the anode 40*a* and the cathode 40*b* of the electrode pair 40 are reversely arranged in the electrolyzer tank 102. According to the electrolyzed water production apparatus 200 thus constituted, in any one of the three regions R201, 8202, 8203 of the electrolyzer tank 102, an anode and a cathode are arranged so as to face each other without a diaphragm between them. Therefore, neutral-range electrolyzed water can be preferentially produced. Hence, it is possible to produce various types of electrolyzed waters having a pH of the physiologically neutral range and suitable for use in a living body can be produced with a further higher production efficiency by an extremely compact apparatus structure.

Furthermore, in individual embodiments, the shapes of the anode and cathode are not limited to a simple flat-plate and may have an appropriate shape depending upon the shape of the electrolyzer tank (2 and 102), etc. Furthermore, the number of electrode pairs are not limited to those shown in the figures. Furthermore, electrolyzed water production apparatus 1, 100, 200 may be provided in multiple stages to form a unit. Moreover, the power supply units 3 may be individually connected to the electrode pairs. In addition, the power supply units 3 are separately provided to the electrode pairs 10, 20, 30, 40, and 50.

As is described in the foregoing, in the electrolyzed water production apparatus and electrolyzed water production method disclosed herein, various types of electrolyzed waters having a natural-range pH can be safely and simply produced, and further simultaneously with strong acidic electrolyzed water and strong alkaline electrolyzed water depending upon the structure. The apparatus and method can be widely used in the medical field (medical facilities, home medical care, senior care institution) where sterilization and disinfection of microorganisms etc. are desired and in ordinary home and further in various fields including manufacturing, cleansing, maintenance of precision instruments (not limited to these).

What is claimed is:

1. An apparatus for producing electrolyzed water, comprising:
    at least one power supply;
    a plurality of electrode pairs coupled with the at least one power supply, each of the electrode pairs of the plurality comprising a diaphragm disposed between an anode and a cathode; and
    an electrolyzer tank partitioned into a plurality of regions by the diaphragm of each of the electrode pairs, in one region of the plurality of regions, the anode of one of the electrode pairs facing the cathode of another of the electrode pairs.

2. The apparatus of claim 1, wherein the plurality of electrode pairs comprises two electrode pairs, the diaphragm of each of the two electrode pairs partitioning the electrolyzer tank into three regions.

3. The apparatus of claim 1, wherein the anode of the one of the electrode pairs facing the cathode of the another of the electrode pairs are arranged without a diaphragm therebetween.

4. The apparatus of claim 1, wherein the plurality of electrode pairs are positioned so that a distance between can be controlled.

5. The apparatus of claim 4, wherein the electrode pairs are controlled to produce the electrolyzed water having a pH of between about 2.7 and about 7.5 and an available chlorine concentration of between about 10 and about 60 ppm.

6. The apparatus of claim 1, wherein the at least one power supply is configured to apply a different voltage to each of the plurality of electrode pairs.

7. The apparatus of claim 1, wherein the electrolyzer tank has a cylindrical shape and the plurality of regions each have a flat fan shape.

8. A method for producing electrolyzed water, comprising:
    providing an apparatus for producing electrolyzed water, the apparatus comprising:
        at least one power supply;
        a plurality of electrode pairs coupled with the at least one power supply, each of the electrode pairs of the plurality comprising a diaphragm disposed between an anode and a cathode; and
        an electrolyzer tank partitioned into a plurality of regions by the diaphragm of each of the electrode pairs, in one region of the plurality of regions, the anode of one of the electrode pairs facing the cathode of another of the electrode pairs;
    exposing water to the plurality of electrode pairs disposed in the plurality of regions of the electrolyzer tank; and
    supplying power to the plurality of electrode pairs to produce the electrolyzed water.

9. The method of claim 8, further comprising controlling a distance between the anode and the cathode of each of the electrode pairs to produce the electrolyzed water having a pH of between about 2.7 and about 7.5 and an available chlorine concentration of between about 10 ppm and about 60 ppm.

10. The method of claim 9, wherein exposing water to the plurality of electrode pairs comprises exposing the water to the plurality of electrode pairs, the anode of a first electrode pair directly facing the cathode of a second electrode pair.

11. The method of claim 8, wherein exposing water to the plurality of electrode pairs comprises exposing the water to two electrode pairs, the anode of one of the two electrode pairs facing the cathode of another of the two electrode pairs in one region of the plurality of regions of the electrolyzer tank.

12. The method of claim 8, wherein exposing water to the plurality of electrode pairs disposed in the plurality of regions of an electrolyzer tank comprises exposing the water to two pairs of electrodes disposed in three regions of the electrolyzer tank.

13. The method of claim 8, wherein exposing water to the plurality of electrode pairs comprises exposing the water to the plurality of electrode pairs, the anode of a first electrode pair directly facing the cathode of a second electrode pair.

14. A method for fabricating an apparatus for producing electrolyzed water, comprising:
    disposing a plurality of electrode pairs in an electrolyzer tank, each of the plurality of electrode pairs comprising a diaphragm disposed between an anode and a cathode;
    arranging the diaphragm of each of the plurality of electrode pairs to partition the electrolyzer tank into a plurality of chambers; and
    arranging the anode of one of the plurality of electrode pairs to directly face the cathode of another of the plurality of electrode pairs in at least one region of the plurality of regions.

15. The method of claim 14, wherein arranging the diaphragm of each of the plurality of electrode pairs to partition the electrolyzer tank into a plurality of chambers comprises arranging the diaphragm of each of the plurality of electrode pairs to partition the electrolyzer tank having a cylindrical shape into at least three regions having a flat fan shape.

16. The method of claim 14, wherein further comprising coupling the plurality of electrode pairs to a single power supply.

17. The method of claim 14, further comprising changing the distance between the plurality of electrode pairs to control a pH and a chlorine concentration of the electrolyzed water produced by the apparatus.

18. The method of claim 14, wherein arranging the anode of one of the plurality of electrode pairs to directly face the cathode of another of the plurality of electrode pairs comprises arranging the anode of the one of the plurality of electrode pairs to directly face the cathode of the another of the plurality of electrode pairs without a diaphragm disposed therebetween.

* * * * *